(12) United States Patent
Yan et al.

(10) Patent No.: US 8,375,561 B2
(45) Date of Patent: Feb. 19, 2013

(54) MANUFACTURING METHOD FOR STATOR STRUCTURE AND MICROMOTOR HAVING THE SAME

(75) Inventors: Guo-Jhih Yan, Kaohsiung (TW);
Jing-Hui Wang, Taipei County (TW);
Sheng-Zhan Yan, Kaohsiung County (TW); Guang-Miao Huang, Kaohsiung (TW); Liang-Yi Hsu, Makung (TW);
Mi-Ching Tsai, Tainan (TW)

(73) Assignee: Metal Industries Research & Development Center, Kaohsiung (TW)

( * ) Notice: Subject to any disclaimer, the term of this patent is extended or adjusted under 35 U.S.C. 154(b) by 443 days.

(21) Appl. No.: 12/650,084

(22) Filed: Dec. 30, 2009

(65) Prior Publication Data

US 2011/0037354 A1   Feb. 17, 2011

(30) Foreign Application Priority Data

Aug. 14, 2009 (TW) ................ 98127425 A

(51) Int. Cl.
*H02K 15/04* (2006.01)
(52) U.S. Cl. ......... 29/596; 29/598; 29/605; 310/40 MM
(58) Field of Classification Search ............... 29/592.1, 29/596–598, 732–736, 602, 605; 310/266, 310/254.179, 68 B, 208
See application file for complete search history.

(56) References Cited

U.S. PATENT DOCUMENTS

| | | | |
|---|---|---|---|
| 3,726,004 A * | 4/1973 | Holland et al. | 29/602.1 |
| 4,271,370 A * | 6/1981 | DiMeo | 310/266 |
| 4,665,331 A | 5/1987 | Sudo et al. | |
| 6,568,065 B2 * | 5/2003 | Graham et al. | 29/596 |
| 6,864,613 B1 * | 3/2005 | Graham et al. | 310/195 |
| 7,986,063 B2 * | 7/2011 | Nakamura et al. | 310/40 MM |
| 2011/0037354 A1 * | 2/2011 | Yan et al. | 310/68 B |

* cited by examiner

*Primary Examiner* — Minh Trinh
(74) *Attorney, Agent, or Firm* — Morris Manning & Martin LLP; Tim Tingkang Xia, Esq.

(57) ABSTRACT

A manufacturing method for a stator structure and a micromotor having the same. The method includes: providing a flexible printed circuit (FPC) on which configuration positions of coil windings and a configuration position of at least one position signal generating unit are formed, wherein the FPC is further provided with an interface part; disposing the coil windings and the position signal generating unit on the coil winding configuration positions and the position signal generating unit configuration position, respectively, wherein the interface part is further provided with a connector pattern which is electrically coupled with the coil windings and the position signal generating unit; forming a FPC assembly including the coil windings and the position signal generating unit; and winding the FPC assembly to form the stator. The stator is applied in a micromotor in which a rotor, the stator and a case are disposed outward in a radial direction.

8 Claims, 6 Drawing Sheets ively small space in the micromotor, such that a size of the motor can be miniaturized.

MANUFACTURING METHOD FOR STATOR STRUCTURE AND MICROMOTOR HAVING THE SAME

CROSS-REFERENCE TO RELATED APPLICATION

This application claims the benefit of Taiwan Patent Application No. 098127425, filed on Aug. 14, 2009, which is hereby incorporated by reference for all purposes as if fully set forth herein.

BACKGROUND OF THE INVENTION

1. Field of Invention

The present invention relates to a stator structure and a micromotor having the same, and more particularly to a micromotor and a manufacturing method therefor, wherein the stator structure is constituted by a flexible printed circuit (FPC) configured with the required electrical elements of the micromotor.

2. Related Art

In a conventional micromotor, a stator includes primarily a magnetoconductive housing which is provided with upper and lower pole plates and is formed by stamping, bending and welding a magnetoconductive material in sheet form; and coil windings which are configured on the magnetoconductive housing. However, in stamping, bending and winding processes, due to lots of upper and lower pole plates and great length for winding, the processing of stamping, bending and winding may have considerable difficulty in manufacturing. In addition, it is difficult to further reduce a size of the micromotor. As a result, manufacturers try to apply flexible circuits to the stator.

For example, the U.S. Pat. No. 4,665,331 discloses a brushless DC (Direct Current) micromotor, wherein the stator coil is formed by coaxially winding more than one coil winding formed on an insulating sheet, on which coil winding a plurality of coil patterns are continuously provided in series in the direction of winding, and a control unit of the motor supplies electricity to provide magnetic thrust force of different phases, such that a rotor in a center of the motor can be pushed (or driven) to rotate.

Yet, the prior art only considers how to configure the coil windings, whereas other electrical elements or the control unit will be still configured in a motor case by other assembling means. Therefore, it is unable to effectively reduce an assembling time and flow of the motor. In addition, to allow the brushless DC micromotor to rotate successfully, the Hall devices or similar elements is adopted to be deployed to sense magnetic poles of the rotor, thereby sensing a position of the rotor to transmit the position information of the rotor to the control unit of the micromotor. The control unit will then control an operation of the coil windings, depending on the position of the rotor, to switch among phases. Besides, to enable the motor to be applied to a high precision control field, it may need to install a more precise position encoder. Nevertheless, the installation of the position encoder or the Hall devices will add more steps in the assembling procedure of the micromotor and will in turn spend more manufacturing man-hours and cost. Furthermore, as each element is not aligned easily, it will further affect yields of the micromotor.

Accordingly, it is an issue to be thought of by existing manufacturers to effectively provide a micromotor for which manufacturing processes can be decreased, a cost can be reduced, an accuracy of sensitive of a rotation position of the motor can be improved, and an entire size can be maintained or miniaturized.

SUMMARY OF THE INVENTION

The object of the present invention is to provide a micromotor and a manufacturing method therefor, wherein space can be saved, configuration positions of the motor elements can be designed according to a practical need and a manufacturing time can be shortened.

The present invention provides a stator structure, being applied in a micromotor in which a rotor, the stator and a case are disposed outward in a radial direction, with the rotor being pivotly connected in the case, the stator comprising a flexible printed circuit (FPC) assembly which is configured with plural coil windings and at least one position signal generating unit, the FPC assembly being coaxial to the rotor and circumferentially disposed between the rotor and the case.

The present invention provides a stator manufacturing method. The method comprises the following steps: providing a FPC on which configuration positions of plural coil windings and a configuration position for at least one position signal generating unit are formed; disposing the plural coil windings and the at least one position signal generating unit on the coil winding configuration positions and the position signal generating unit configuration position, respectively; forming a FPC assembly which contains the coil windings and the position signal generating unit; and winding the FPC assembly to form the stator.

The present invention provides a micromotor, and the micromotor comprises a case, a rotor and a stator.

The rotor includes a shaft and is pivotly connected in the case through the shaft. The stator includes a FPC assembly configured with plural coil windings and at least one position signal generating unit. In addition, the FPC assembly is coaxial to the rotor and circumferentially disposed between the rotor and the case, with the rotor as an axis.

The present invention provides a micromotor manufacturing method. The method comprises the following steps: providing a case and a rotor; providing a FPC on which configuration positions of plural coil windings and a configuration position for at least one position signal generating unit are formed; disposing the plural coil windings and the at least one position signal generating unit on the coil winding configuration positions and the position signal generating unit configuration position, respectively; forming a FPC assembly which contains the coil windings and the position signal generating unit; winding the FPC assembly to form a stator; and assembling together the case, the rotor and the stator, wherein the rotor is pivotly connected in the case, the stator is coaxial to the rotor to be circumferentially disposed between the rotor and the case, and the configuration positions of the coil windings and the at least one position signal generating unit are corresponding to magnetic poles of the rotor.

For a stator structure, a micromotor having the stator and a manufacturing method therefor disclosed by the present invention, coil windings and a position signal generating unit required by the stator are holistically designed and configured on a FPC to save a manufacturing cost and avoid the alignment problem during assembly. On the other hand, this micromotor does not need to be deployed with additional detecting elements like the Hall devices and can still provide a commutation signal or a high resolution pulse wave signal to a control unit of the motor, such that the motor can be applied to a high precision control field. Moreover, all the electrical elements can be integrated into the FPC and properly configured in an inner space of the motor to form the integral stator; therefore, the structure of stator can be diminished effectively, thereby miniaturizing the motor. Besides, the position signal generating unit can be configured on the FPC in a wiring pattern without using a larger position detecting element, such as an optical encoder, which facilitates the miniaturization of the motor.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

In order to provide a further understanding to purposes, structural features, and functions of the present invention, detailed description is given below through related embodiments and drawings.

Figure 1:
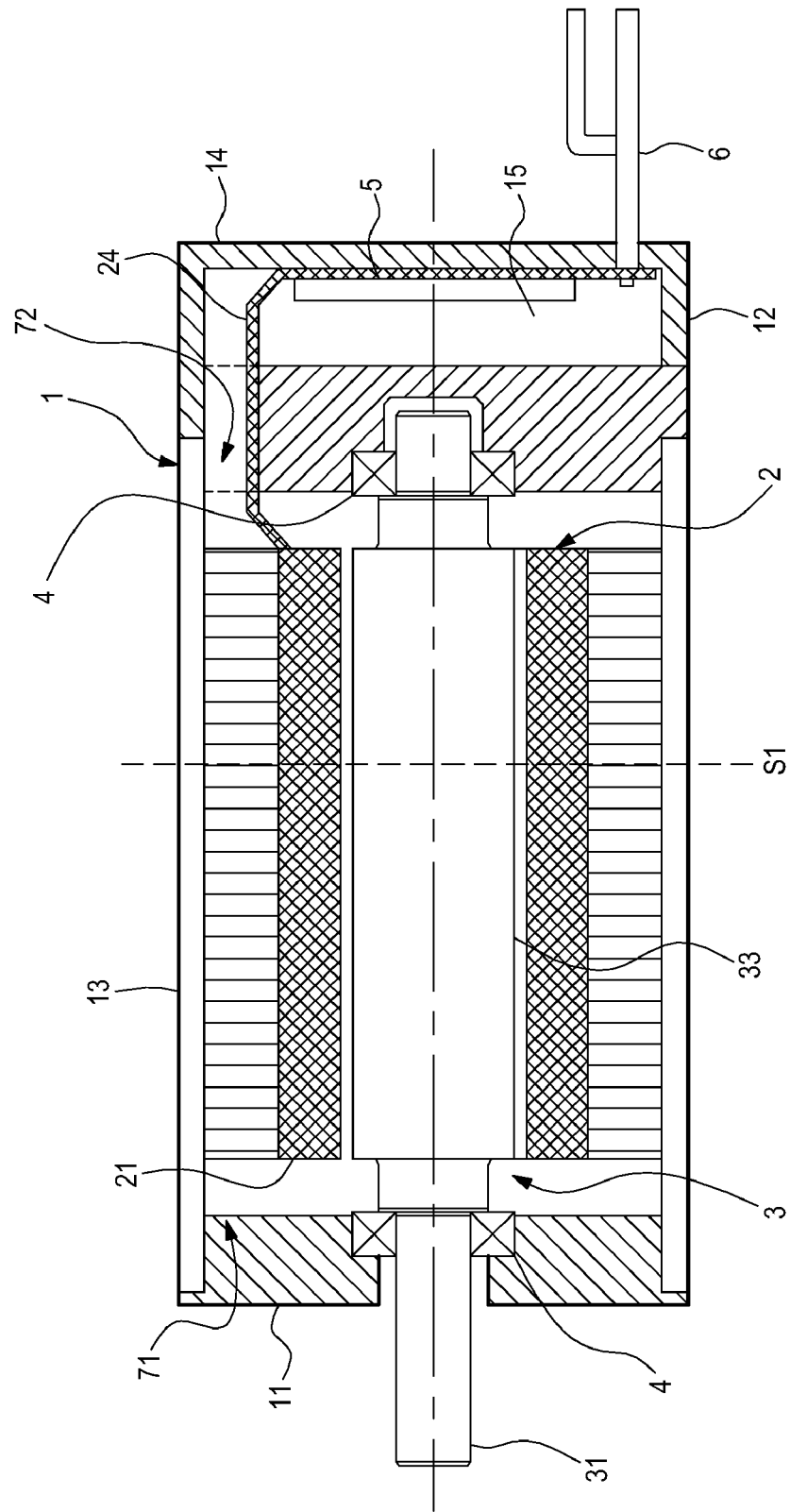
FIG. 1 shows a perspective view of an embodiment of a micromotor of the present invention.
Figure 2:
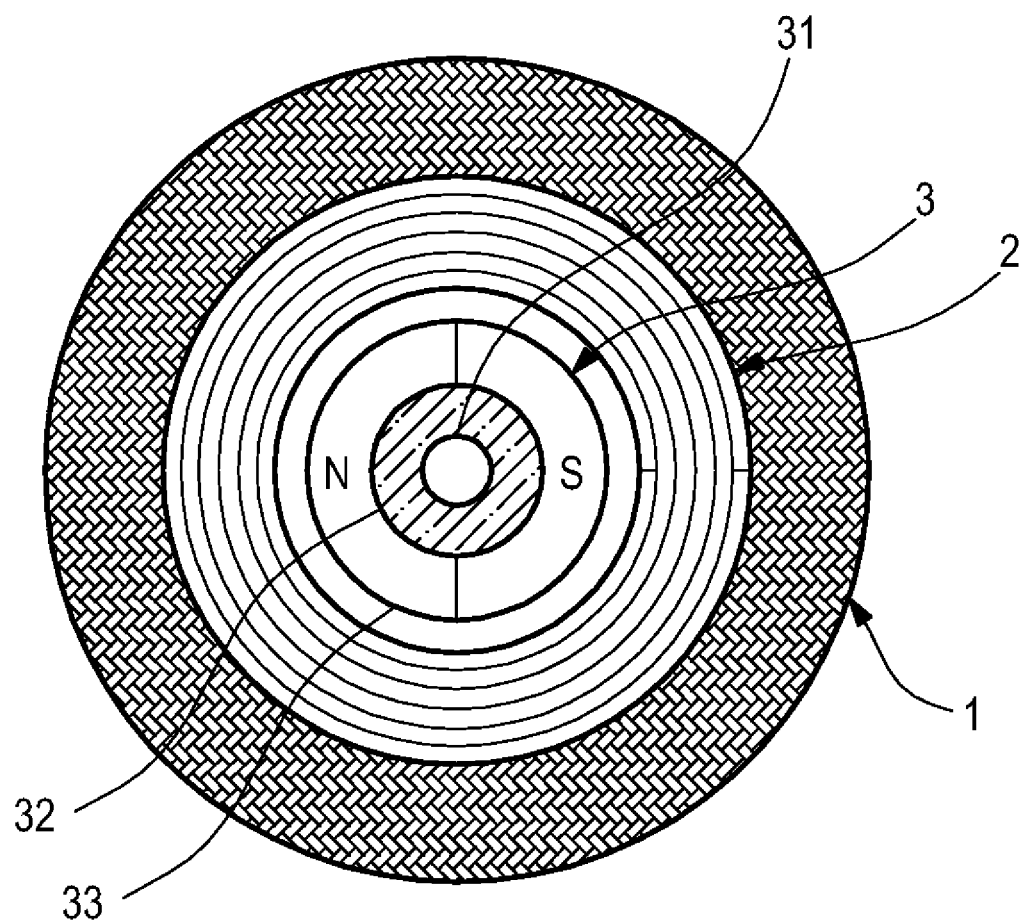
FIG. 2 shows a cutaway view of the micromotor in FIG. 1, along a cutting line S1.
Figure 3A:
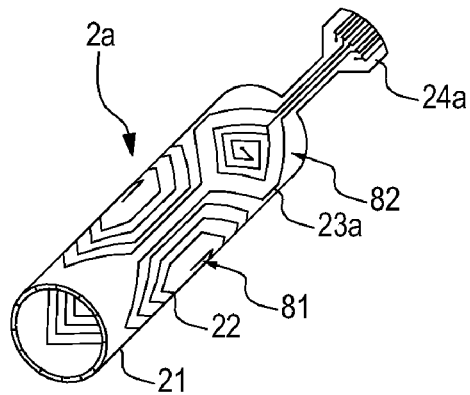
FIG. 3A shows a perspective view of a stator 2a of an embodiment of the present invention.
Figure 3B:
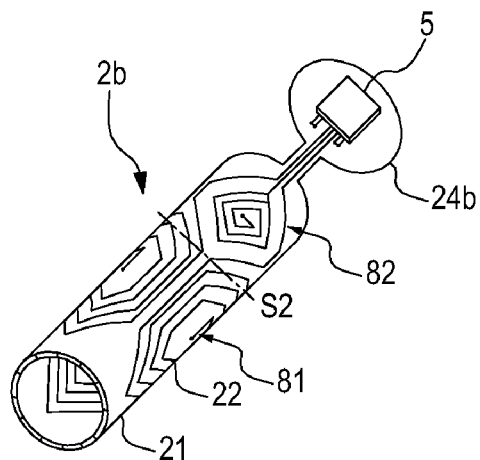
FIG. 3B shows a perspective view of a stator 2b of an embodiment of the present invention.
Figure 3C:
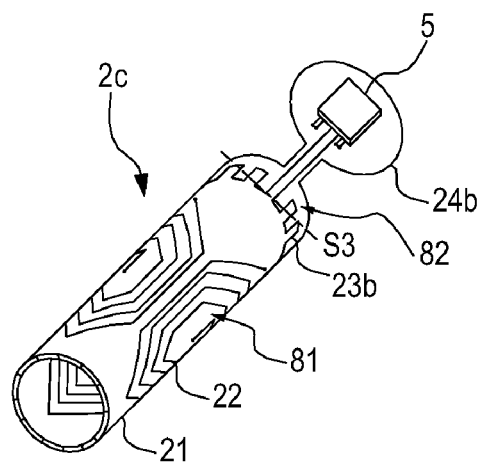
FIG. 3C shows a perspective view of a stator 2c of an embodiment of the present invention.
Figure 4A:
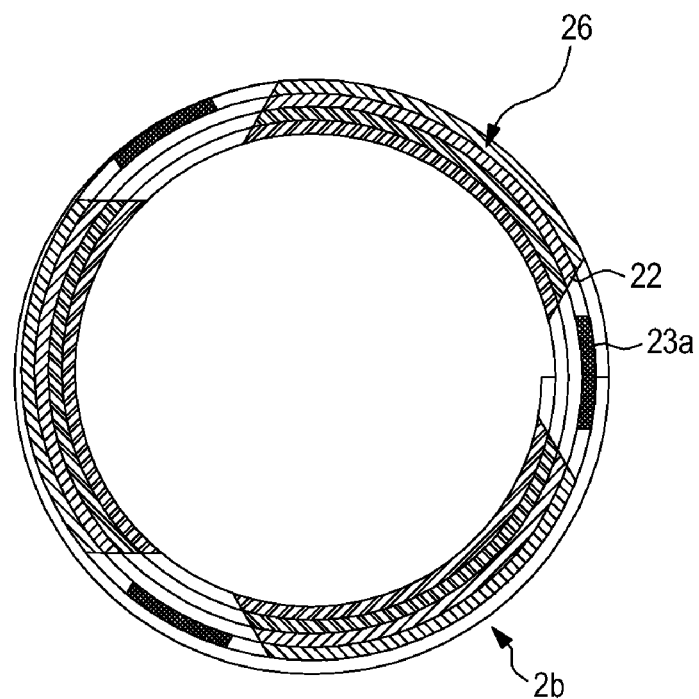
FIG. 4A shows a cutaway view of the stator 2b of an embodiment of the present invention, along a cutting line S2.
Figure 4B:
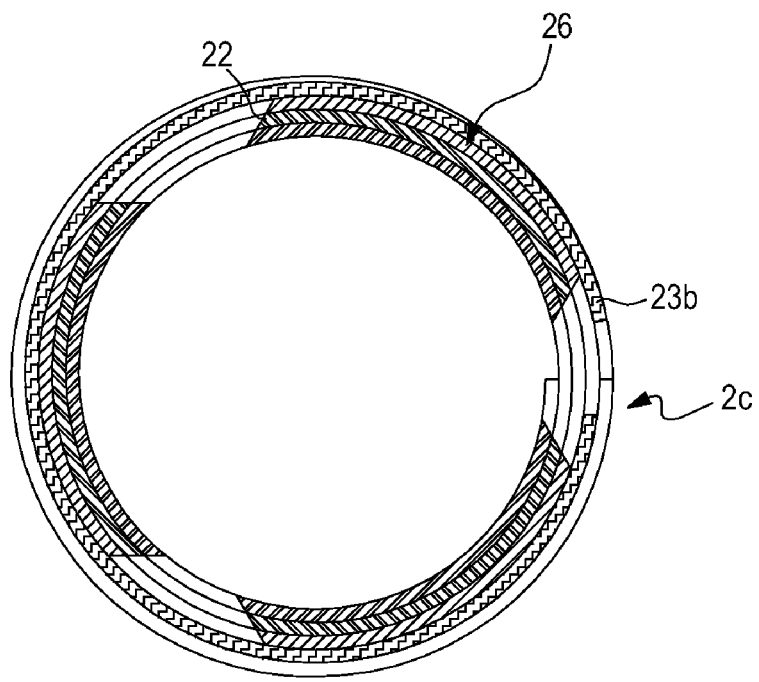
FIG. 4B shows a cutaway view of the stator 2c of an embodiment of the present invention, along a cutting line S3.

Referring to FIGS. 1 to 4B at the same time, FIG. 1 shows a perspective view of an embodiment of a micromotor of the present invention, FIG. 2 shows a cutaway view of the micromotor in FIG. 1 along a cutting line S1, FIGS. 3A to 3C show perspective views of three embodiments of different stator structures of the present invention, FIG. 4A shows a perspective view of a stator 2b of an embodiment of the present invention along a cutting line S2 and FIG. 4B shows a perspective view of a stator 2c of an embodiment of the present invention along a cutting line S3. As shown in FIG. 1, the micromotor includes three parts which are a rotor 3, a stator 2 and a case 1 disposed outward in a radial direction.

Referring to FIG. 1 and FIG. 2, the rotor 3 is constituted by a shaft 31, a magnetoconductive element 32 and a magnet 33. The magnetoconductive element 32 surrounds on the shaft 31, the magnet 33 surrounds an outermost side of the rotor 3 and is provided with at least one combination of magnetic poles having opposite polarities (N-pole and S-pole), with the magnetic poles of hetero polarities being configured adjacent to one another.

Referring to FIGS. 3A to 3C, the stator 2a, 2b, 2c includes a flexible printed circuit (FPC) assembly 21 on which plural coil windings 22 and at least one position signal generating unit are disposed. The position signal generating unit can be a commutation detecting module 23a or a rotation frequency generating module 23b, the coil windings 22 and the position signal generating unit are configured on the FPC assembly 21 in a wiring pattern, and a proper position on the FPC assembly 21 is reserved with a related wiring for connecting to a control unit 5. This control unit 5 is driven by electricity to control the coil windings 22.

For the stator 2a shown in FIG. 3A, the FPC assembly 21 is configured with the plural coil windings 22 and each coil winding 22 is controlled by the control unit 5 to generate a magnetic field of different directions and magnetic intensities, depending on current direction and current intensity sent by the control unit 5. When the FPC assembly 21 is being manufactured, an interface part 24a is extended therefrom according to the installation position of the control unit 5. In the present embodiment, the interface part 24a is extended from, but not limited to, an end of the FPC assembly 21; the interface part 24a can be also provided at a proper position on the FPC assembly 21. The interface part 24a is disposed with a connector pattern which is electrically coupled with the coil windings 22 and the position signal generating unit. The connector pattern allows the external control unit 5 to be electrically coupled with this connector pattern by external connection and enables the control unit 5 to be electrically coupled with the coil windings 22 and position signal generating unit. In FIG. 3A, the control unit 5 is not configured on the stator 2a or the interface part 24a, and the coil windings 22 and the position signal generating unit are connected with the control unit 5 through the connector pattern. The position signal generating unit, such as the commutation detecting module 23a which is a helical induction coil to induce a change of magnetic poles of the rotor 3, provides a commutation signal to the control unit 5. According to this commutation signal, the control unit 5 determines a relative position of the rotor 3 when it is rotating, and calculates a commutation timing of the coil windings 22 with respect to the magnetic poles of the rotor 3.

The stator 2b shown in FIG. 3B is similar to the stator 2a shown in FIG. 3A, except that the control unit 5 is directly disposed on the interface part 24b of the FPC assembly 21 and is electrically coupled with the coil windings 22 and the position signal generating unit. In addition, the control unit 5 and the interface part 24b can be accommodated at a proper position in the motor case 1 as shown in FIG. 1.

The stator 2c shown in FIG. 3C is similar to the stators 2a and 2b shown in FIG. 3A and FIG. 3B, except that the position signal generating unit of the stator 2c is the rotation frequency generating module 23b. The rotation frequency generating module 23b is configured on the FPC assembly 21 in a wiring pattern and is configured as square waveform induction segments. When the rotor 3 rotates, the rotation frequency generating module 23b will induce a change of magnetic field to produce a pulse wave signal which is transmitted to the control unit 5. According to the pulse wave signal obtained, the control unit 5 determines the rotation frequency and the rotation position of the rotor 3, and calculates a commutation timing of the coil windings 22 with respect to the magnetic poles of the rotor 3.

Besides, the interface part 24b of the stator 2c, as shown in FIG. 3C, can be replaced by the interface part 24a shown in FIG. 3A to connect externally with the control unit 5.

Referring to FIG. 3B and FIG. 4A, FIG. 4A shows a cutaway view of the stator 2b in FIG. 3B, along the cutting line S2. Three stators shown in FIGS. 3A to 3C are similar and herein the description is first on the stator 2b in FIG. 3B. When designing the stator 2b, a designer should deduce how many coil windings 22 and commutation detecting modules 23a are required so as to infer the configuration positions of each coil winding 22 and commutation detecting module 23a when the FPC assembly 21 is wound into the tubular stator 2b.

As shown in FIG. 4A, when the FPC assembly 21 is wound into the tubular stator 2b, a plurality of coil winding assemblies 26 are formed. Each coil winding assembly 26, which includes at least one coil winding 22, surrounds on the tubular FPC assembly 21. In the present embodiment, there are three coil winding assemblies 26 (forming a three-phase motor) which surround on the stator 2b and are equally space apart. Each coil winding assembly 26 is constituted by stacking the plural coil windings 22, and one commutation detecting module 23a is disposed between every two coil winding assemblies 26 for inducing a change of magnetic poles of the rotor 3.

Referring to FIG. 3C and FIG. 4B, FIG. 4B shows a cut-away view of the stator 2c in FIG. 3C, along the cutting line S3. When designing the stator 2c, the designer should deduce how many coil windings 22 and rotation frequency generating modules 23b are required so as to infer the configuration positions of each coil winding 22 and the rotation frequency generating module 23b when the FPC assembly 21 is wound into the tubular stator 2c.

As shown in FIG. 4B, when the FPC assembly 21 is wound into the tubular stator 2c, a plurality of coil winding assemblies 26 are formed. Each coil winding assembly 26, which includes at least one coil winding 22, surrounds on the tubular FPC assembly 21. In the present embodiment, there are three coil winding assemblies 26 (forming a three-phase motor) which surround on the stator 2c and are equally space apart. Each coil winding assembly 26 is constituted by stacking the plural coil windings 22 and an exterior side of the coil winding assembly 26 is configured with the rotation frequency generating module 23b that appears as a saw-toothed induction coil in the present embodiment to induce a change of magnetic poles of the rotor 3 and to provide a pulse wave signal to the control unit 5.

As shown in FIG. 1, FIG. 2, FIG. 3B (or FIG. 3C, FIG. 3A) and FIG. 4A (or FIG. 4B), the case 1 is formed by plural parts, including a first seat body 11, a second seat body 12, a rear cover 14 and an outer casing 13. The outer casing 13 defines an open accommodation space, the first seat body 11 and the second seat body 12 are configured respectively at a first opening 71 and a second opening 72 of the outer casing 13. The rear cover 14 joins with the second opening 72 that is configured at the second seat body 12 of the outer casing 13, enabling the case 1 to be trough shaped that the second seat body 12 will be located at a proper position in the case 1 and an element mounting space 15 will be formed between the second seat body 12 and the rear cover 14.

In the present embodiment, the rotor 3 is configured in the case 1, and two ends of the shaft 31 of the rotor 3 are pivotly connected to the first seat body 11 and the second seat body 12, receptively. Bearings 4 are configured between the one end of the shaft 31 and the first seat body 11 as well as between the other end of the shaft 31 and the second seat body 12, allowing the rotor 3 to rotate around the axis line thereof as a center. The stator 2, on the other hand, is circumferentially disposed between the rotor 3 and the case 1 with the rotor 3 as an axis.

As shown in FIG. 1 and FIG. 2, the interface part 24 which is extended from the FPC assembly 21 will enter into and be fixed in the element mounting space 15 from a gap between the second seat body 12 and the case 1, according to a shape of the case 1 and the configuration position of the rotor 3.

The designer can dispose the control unit 5 inside the case 1 or a proper position outside the case 1, according to requirements. When being configured outside the case 1, the control unit 5 can connect to the connector pattern on the interface part 24a of the stator 2a as shown in FIG. 3A through a wire penetrating from outside into the inside of the case 1, allowing the control unit 5 to be electrically coupled with the coil windings 22 and the position signal generating unit through the connector pattern of the FPC assembly 21. On the other hand, when being configured in the case 1, the control unit 5 can be disposed on the interface part 24b of the stator 2b as shown in FIG. 3B, wherein the interface part 24b is disposed in the element mounting space 15 and the control unit 5 may operate by connecting to an external power source 6 through a wiring of the interface part 24b, and then supply power to or even control an operating mode of each element (e.g., the coil windings 22 and the position signal generating unit) of the FPC assembly 21 through the wiring of the interface part 24b.

Figure 5:
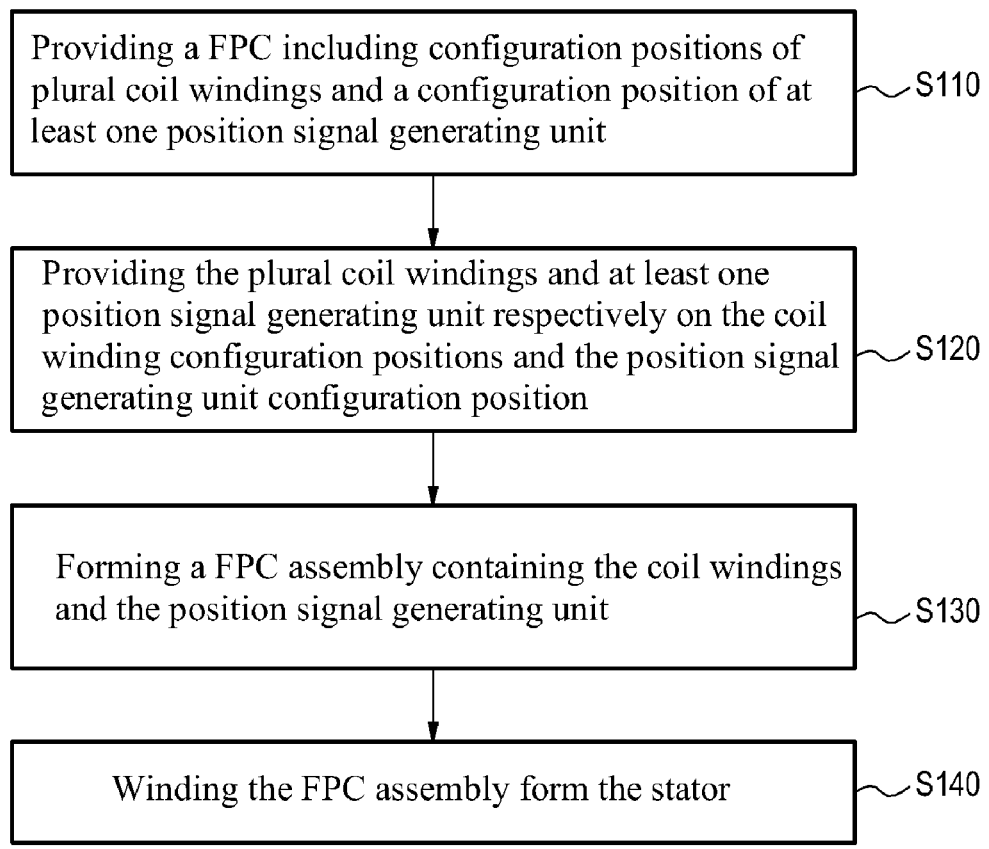
FIG. 5 shows a flow diagram of an embodiment of a stator manufacturing method of the present invention.

As shown in FIG. 5 which shows a flow diagram of an embodiment of a stator manufacturing method of the present invention, and referring to FIGS. 1 to 4B for a better understanding, the stator manufacturing method is disclosed hereinafter.

A FPC including configuration positions of plural coil windings and a configuration position for at least one position signal generating unit is provided (step S110). Before making the stator 2, the designer should first consider the structures to be used in the micromotor, such as the positions of magnetic poles of the rotor 3, the shape of the case 1, the position where the shaft 31 is pivotly connected, the pre-determined configuration position of the control unit 5, the way of inserting a power wire into the case 1 for the control unit 5, and the method of connecting the control unit 5 to the stator 2. Next, according to the above data, such as the arrangement of magnetic poles of the rotor 3, the designer determines how many coil windings 22 and position signal generating units are to be designed, and plans coil winding configuration positions 81 for each coil winding 22 and more than one position signal generating unit configuration position 82 on the FPC (as shown in FIG. 3A, FIG. 3B or FIG. 3C). The designer also deduces the configuration position of the control unit 5 and the configuration position of the power wire in the case 1 so as to determine whether to design the interface part 24 on the FPC, according to the shape of the case 1.

The plural coil windings and the at least one position signal generating unit are provided respectively on the coil winding configuration positions and the position signal generating unit configuration position (step S120). Through the layout and manufacture process of the FPC, the coil windings 22 and the position signal generating unit are disposed on the FPC, according to each coil winding configuration position 81 and the position signal generating unit configuration position 82. Moreover, the control unit 5 is configured on the FPC.

The FPC that includes the coil windings and the position signal generating unit is punched to form FPC pieces, such that each FPC piece can form a FPC assembly 21 (step S130). According to the shape of the case 1, the configuration types and positions of the coil windings 22 and the position signal generating unit and whether to configure the interface part 24, a desired shape is planned on the FPC and the FPC is punched to FPC pieces such that each FPC piece can form a FPC assembly containing the coil windings and the position signal generating unit.

The FPC assembly is wound to form the stator (step S140). In this step, the FPC assembly 21 is wound to form the stator 2 to be configured between the case 1 and the rotor 3, wherein the position signal generating unit can be the commutation detecting module 23a or the rotation frequency generating module 23b. In addition, to deal with the design requirement, the designer can directly configure the control unit 5 on the FPC assembly 21 or on the interface part 24 that is extended from the FPC assembly 21.

Figure 6:
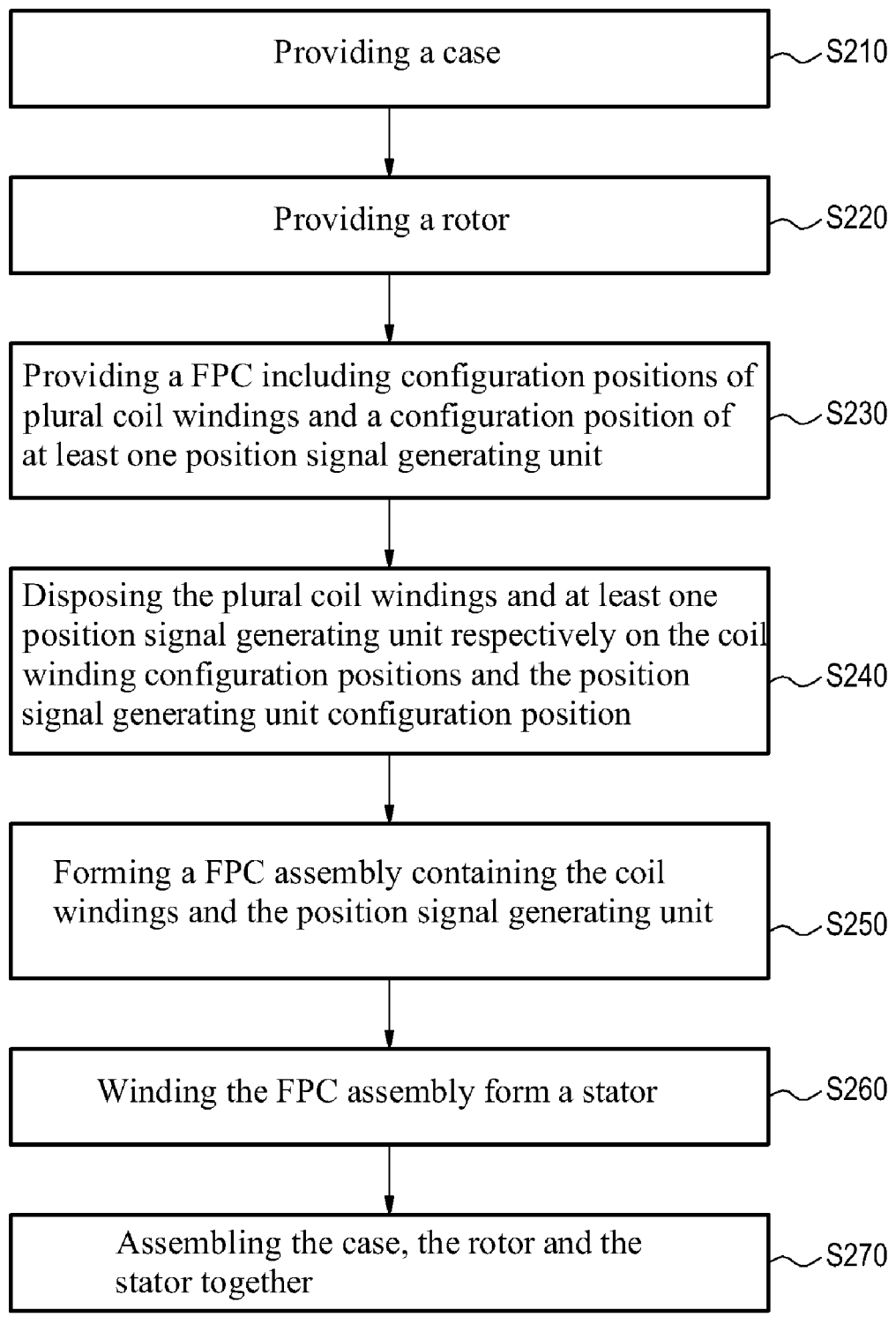
FIG. 6 shows a flow diagram of an embodiment of a manufacturing method of a micromotor having a stator, according to the present invention.

As shown in FIG. 6, it shows a flow diagram of an embodiment of a manufacturing method of a micromotor which is provided with the stator 2, according to the present invention, and refers to FIGS. 1 to 4 for a better understanding. The manufacturing method of the micromotor is disclosed hereinafter.

A case 1 is provided (step S210). The case 1 is in a cylindrical shape and an interior of the case 1 is an open accommodation space.

A rotor 3 is provided (step S220). The rotor 3 includes the shaft 31, the magnetoconductive element 32 and the magnet 33. The magnetoconductive element 32 surrounds on the shaft 31 and the magnet 33 surrounds on an exterior side of the magnetoconductive element 32 to be configured at the outermost side of the rotor 3. The magnet 33 is provided with at least one combination of magnetic poles (an N-pole and a S-pole), with the magnetic poles of hetero polarities being adjacent to one another. The execution order of the step S210 and the step S220 can be adjusted based upon a design concept of the designer.

A FPC including configuration positions of plural coil windings and a configuration position of at least one position signal generating unit is provided (step S230). As described in the step S110, the designer first considers the inner shape of the case 1, the positions of magnetic poles of the rotor 3 and a wiring path of each element to deduce the required quantities of the coil windings 22 and the position signal generating unit, such that the coil winding configuration position 81 of each coil winding 22 and more than one position signal generating unit configuration position 82 can be arranged on the FPC. Moreover, a desired shape of the FPC assembly is planned after whether the interface part 24 is designed in the FPC is determined.

The plural coil windings and the at least one position signal generating unit are disposed respectively on the coil winding configuration positions and the position signal generating unit configuration position (step S240). As described in the step S120, according to each coil winding configuration position 81 and the position signal generating unit configuration position 82, the coil windings 22 and the position signal generating unit are provided on the FPC. Furthermore, the control unit 5 is configured on the FPC.

The FPC that contains the coil windings and the position signal generating unit is punched to FPC pieces, such that each piece can form a FPC assembly (step S250). According to the desired shape, the FPC is punched to form a FPC assembly 21 each including the coil windings and the position signal generating unit.

The FPC assembly is wound to form a stator (step S260). According to the inner shape of the case 1, the configuration types and positions of the coil windings 22 and the position signal generating unit, a configuration position of the interface part 24, and a pre-determined configuration position of the rotor 3 and directions of magnetic poles thereof, the FPC assembly 21 is wound to form the stator 2 which can be disposed in the case 1, corresponding to the directions of magnetic poles of the rotor 3, wherein the position signal generating unit can be the commutation detecting module 23a or the rotation frequency generating module 23b. Besides, to deal with the design requirement, the designer can configure the control unit 5 directly on the FPC assembly 21 or on the interface part 24 that is extended from the FPC assembly 21.

As the step S230 to the step S260 are the same as the manufacturing process of the stator 2 in FIG. 5, they are not disclosed further.

The case 1, the rotor 3 and the stator 2 are assembled together (step S270). As shown in FIGS. 1 to 4B, through the shaft 31, the rotor 3 is pivotly connected to the first seat body 11 and the second seat body 12, such that the rotor 3 can rotate in the case 1. The FPC assembly 21 of the stator 2, which is coaxial to the rotor 3, is circumferentially disposed between the rotor 3 and the case 1, and the configuration positions of the coil windings 22 and the position signal generating unit are corresponding to the magnetic poles of the rotor 3. The control unit 5 is electrically coupled with the connector pattern of the interface part 24 on the FPC assembly 21 or is directly provided on the interface part 24. The connector pattern of the interface part 24 will, on the other hand, is electrically coupled with the coil windings 22 and the position signal generating unit; whereas, the control unit 5 is electrically coupled with the coil windings 22 and the position signal generating unit through the interface part 24. According to the rotor 3, the inner shape of the case 1 and gaps among the inner elements, the interface part 24 is disposed on a proper position in the case 1 such as in the element mounting space 15 between the second seat body 12 and the rear cover 14.

As shown in FIG. 1, FIG. 2 and FIG. 4A (or FIG. 4B), when the stator 2 is disposed between the case 1 and the rotor 3 and the FPC assembly 21 is wound to a certain extent, it should be able to stack the coil windings 22 of a same group to form the coil winding assembly 26 and each coil winding assembly 26 is disposed on a related position based upon a pre-determined mode of driving the rotor 3 by the designer, resulting in a magnetic field to push the rotor 3 to rotate, upon receiving electricity.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A stator manufacturing method, with the stator being applied in a micromotor in which a rotor, the stator and a case are disposed outward in a radial direction, comprising:
   providing a flexible printed circuit (FPC) on which configuration positions of a plurality of coil windings and a configuration position of at least one position signal generating unit are formed, wherein the FPC is further provided with an interface part;
   disposing the plurality of the coil windings and the at least one position signal generating unit on the coil winding configuration positions and the position signal generating unit configuration position, respectively, wherein the interface part is further provided with a connector pattern which is electrically coupled with the coil windings and the position signal generating unit;
   forming a FPC assembly including the coil windings and the position signal generating unit; and
   winding the FPC assembly to form the stator.

2. The stator manufacturing method according to claim 1, wherein the at least one position signal generating unit comprises a commutation detecting module.

3. A stator manufacturing method, with the stator being applied in a micromotor in which a rotor, the stator and a case are disposed outward in a radial direction, comprising:
   providing a flexible printed circuit (FPC) on which configuration positions of a plurality of coil windings and a configuration position of at least one position signal generating unit are formed, wherein the FPC is further provided with an interface part;
   disposing the plurality of the coil windings and the at least one position signal generating unit on the coil winding configuration positions and the position signal generating unit configuration position, respectively, wherein a control unit is further provided in the interface part to be electrically coupled with the coil windings and the position signal generating unit through the connector pattern of the interface part forming a FPC assembly including the coil windings and the position signal generating unit; and winding the FPC assembly to form the stator.

4. A micromotor manufacturing method, comprising:

providing a case;

providing a rotor;

providing a flexible printed circuit (FPC) on which configuration positions of a plurality of coil windings and a configuration position of at least one position signal generating unit are formed; disposing the plurality of the coil windings and the at least one position signal generating unit on the coil winding configuration positions and the position signal generating unit configuration position, respectively;

forming a FPC assembly containing the coil windings and the position signal generating unit;

winding the FPC assembly to form a stator; and assembling together the case, the rotor and the stator, the rotor being pivotly connected in the case, the stator being coaxial to the rotor to be circumferentially disposed between the rotor and the case and the configuration positions of the coil windings and the at least one position signal generating unit corresponding to magnetic poles of the rotor.

5. The micromotor manufacturing method according to claim 4, wherein the at least one position signal generating unit comprises a commutation detecting module.

6. The micromotor manufacturing method according to claim 4, wherein in the step of providing a FPC, the FPC is further provided with an interface part.

7. The micromotor manufacturing method according to claim 4, wherein in the step of disposing the plurality of the coil windings and the at least one position signal generating unit on the coil winding configuration positions and the position signal generating unit configuration position respectively, the interface part is further provided with a connector pattern which is electrically coupled with the coil windings and the position generating unit.

8. The micromotor manufacturing method according to claim 6, wherein in the step of disposing the plurality of the coil windings and the at least one position signal generating unit on the coil winding configuration positions and the position signal generating unit configuration position respectively, a control unit is further provided in the interface part.

* * * * *